United States Patent
Abramson

(10) Patent No.: US 10,115,292 B2
(45) Date of Patent: Oct. 30, 2018

(54) SYSTEM AND METHOD FOR AUTOMATIC LOSS PREVENTION OF MOBILE COMMUNICATION DEVICES

(71) Applicant: Richard Abramson, Brooklyn, NY (US)

(72) Inventor: Richard Abramson, Brooklyn, NY (US)

(*) Notice: Subject to any disclaimer, the term of this patent is extended or adjusted under 35 U.S.C. 154(b) by 0 days.

(21) Appl. No.: 15/494,548

(22) Filed: Apr. 24, 2017

(65) Prior Publication Data
US 2017/0337802 A1    Nov. 23, 2017

Related U.S. Application Data

(60) Provisional application No. 62/338,575, filed on May 19, 2016.

(51) Int. Cl.
| | |
|---|---|
| *G08B 21/24* | (2006.01) |
| *G06F 1/16* | (2006.01) |
| *G06F 21/88* | (2013.01) |
| *G06F 21/74* | (2013.01) |
| *G08B 21/02* | (2006.01) |

(52) U.S. Cl.
CPC .......... *G08B 21/24* (2013.01); *G06F 1/163* (2013.01); *G06F 21/74* (2013.01); *G06F 21/88* (2013.01); *G08B 21/0261* (2013.01); *G06F 2221/2111* (2013.01)

(58) Field of Classification Search
CPC ........ G08B 21/24; G06F 1/163; G06F 21/88; G06F 2221/2111; H04W 12/06; H04W 12/12; H04M 1/72572
See application file for complete search history.

(56) References Cited

U.S. PATENT DOCUMENTS

| | | | | |
|---|---|---|---|---|
| 5,119,072 A | * | 6/1992 | Hemingway | G08B 21/023 340/539.1 |
| 5,646,593 A | * | 7/1997 | Hughes | G08B 21/0222 340/539.1 |
| 5,661,460 A | * | 8/1997 | Sallen | G01S 13/84 340/539.1 |
| 5,796,338 A | * | 8/1998 | Mardirossian | G08B 13/1427 340/539.1 |

(Continued)

*Primary Examiner* — Orlando Bousono
(74) *Attorney, Agent, or Firm* — Karthik Murthy; Murthy Patent Law PLLC

(57) ABSTRACT

The solution is to create a device, where if the mobile device or important small item is removed beyond a user-defined distance, such as 2 meters, a visual and noise alarm will activate, thus immediately letting the owner and others know that a theft has occurred.
One embodiment of the invention is a device called an Automatic Loss Prevention Alert Trigger (ALPAT) and software on a mobile device called Automatic Loss Prevention Alert Software (ALPAS).
The ALPAT can be in the form of a small device that a person can keep with them and optionally secure to a keychain. The ALPAS will then keep track of whether the ALPAT is more than a user defined distance from the mobile device.
If the mobile device is removed beyond a user determined distance, such as a distance of 2 m from the device, a visual and noise alarm will activate from the mobile device and possibly form the ALPAT, depending on user settings. This will immediately let the owner and others know that a theft has occurred.

10 Claims, 3 Drawing Sheets

(56) References Cited

U.S. PATENT DOCUMENTS

| | | | | |
|---|---|---|---|---|
| 5,900,817 A * | 5/1999 | Olmassakian | G08B 21/0263 | 340/573.1 |
| 5,939,988 A * | 8/1999 | Neyhart | G08B 21/0216 | 340/539.1 |
| 6,078,260 A * | 6/2000 | Desch | G08B 21/023 | 340/539.1 |
| 7,532,196 B2 | 5/2009 | Hinckley | | |
| 7,973,655 B2 | 7/2011 | Blinnikka | | |
| 7,973,657 B2 | 7/2011 | Ayed | | |
| 8,634,808 B1 * | 1/2014 | Zhong | H04M 1/66 | 340/5.8 |
| 8,958,846 B2 | 2/2015 | Freeny, Jr. | | |
| 9,305,196 B2 | 4/2016 | Schoner et al. | | |
| 9,317,847 B2 | 4/2016 | Candelore et al. | | |
| 2002/0080036 A1 * | 6/2002 | Rabanne | G01S 19/17 | 340/573.1 |
| 2002/0126012 A1 * | 9/2002 | Page | G08B 13/1427 | 340/571 |
| 2005/0280546 A1 * | 12/2005 | Ganley | G08B 13/1427 | 340/573.4 |
| 2009/0249443 A1 * | 10/2009 | Fitzgerald | H04L 63/10 | 726/2 |
| 2009/0249460 A1 * | 10/2009 | Fitzgerald | G06F 21/88 | 726/7 |
| 2009/0251282 A1 * | 10/2009 | Fitzgerald | G06F 21/88 | 340/5.31 |
| 2009/0253406 A1 * | 10/2009 | Fitzgerald | G06F 21/88 | 455/410 |
| 2009/0253408 A1 * | 10/2009 | Fitzgerald | G06F 21/316 | 455/411 |
| 2009/0253410 A1 * | 10/2009 | Fitzgerald | G06F 21/88 | 455/411 |
| 2010/0130233 A1 * | 5/2010 | Parker | H04M 1/72538 | 455/456.3 |
| 2011/0215921 A1 * | 9/2011 | Ben Ayed | G08B 1/08 | 340/539.11 |
| 2011/0293095 A1 * | 12/2011 | Ben Ayed | H04L 63/0492 | 380/270 |
| 2011/0313922 A1 * | 12/2011 | Ben Ayed | G06Q 20/108 | 705/42 |
| 2011/0319051 A1 * | 12/2011 | Reitnour | G01S 19/17 | 455/404.2 |
| 2012/0019361 A1 * | 1/2012 | Ben Ayed | G06F 21/32 | 340/5.83 |
| 2012/0019379 A1 * | 1/2012 | Ben Ayed | G08B 13/1436 | 340/539.1 |
| 2013/0040600 A1 * | 2/2013 | Reitnour | G01S 19/17 | 455/404.2 |
| 2013/0091564 A1 * | 4/2013 | Fitzgerald | G06F 21/88 | 726/17 |
| 2013/0127596 A1 | 5/2013 | Jain et al. | | |
| 2013/0273892 A1 * | 10/2013 | Parker, II | H04W 8/22 | 455/411 |
| 2013/0298208 A1 * | 11/2013 | Ayed | G06F 21/00 | 726/6 |
| 2015/0172916 A1 * | 6/2015 | Parker, II | H04W 12/02 | 455/411 |
| 2015/0179046 A1 | 6/2015 | Stevens et al. | | |
| 2015/0310714 A1 * | 10/2015 | Loveland | G08B 21/22 | 340/539.11 |

* cited by examiner

SYSTEM AND METHOD FOR AUTOMATIC LOSS PREVENTION OF MOBILE COMMUNICATION DEVICES

BACKGROUND

The problem this invention addresses is that people forget their smartphones, tablets or other mobile devices, and then they get stolen. This is particularly worrisome as smartphones are now enabled to process payments through apps such as Apple Pay and Android Pay.

Although there are tracking apps that track a person's mobile phone, thefts usually take place too quickly for tracking apps to be useful, because the owner of the mobile device may not notice that it has been stolen in time to successfully use the tracking ability to find the phone. Also, the thieves may disable tracking or take apart the device or shut off the device thus shutting down tracking or otherwise cause the tracking to not help locate the phone.

Some Bluetooth devices have ranges of up to 100 m, and so a Bluetooth device which sounds an alarm only when the Bluetooth signal is lost from a mobile device is really already too far from the owner's range of vision or control to be useful.

SUMMARY OF INVENTION

The solution is to create a device, where if the mobile device or important small item is removed beyond a user-defined distance, such as 2 meters, a visual and noise alarm will activate, thus immediately letting the owner and others know that a theft has occurred.

One embodiment of the invention is a device called an Automatic Loss Prevention Alert Trigger (ALPAT) and software on a mobile device called Automatic Loss Prevention Alert Software (ALPAS).

The ALPAT can be in the form of a small device that a person can keep with them and optionally secure to a keychain. The ALPAS will then keep track of whether the ALPAT is more than a user defined distance from the mobile device.

If the mobile device is removed beyond a user determined distance, such as a distance of 2 m from the device, a visual and noise alarm will activate from the mobile device and possibly form the ALPAT, depending on user settings. This will immediately let the owner and others know that a theft has occurred.

DETAILED DESCRIPTION

Figure 1:
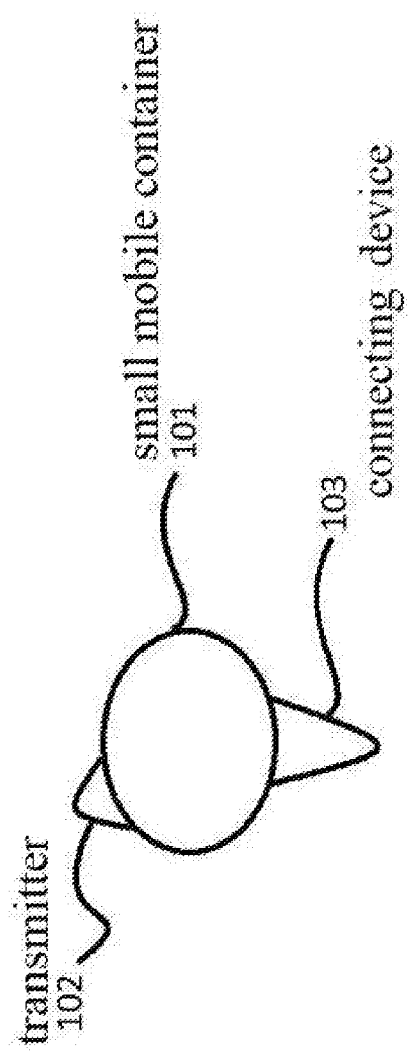
FIG. 1 illustrates a system including one embodiment of the ALPAT.

The ALPAT is a made of a durable material. It contains electronic circuitry such that it can interact with wireless communication signals transmitted by mobile devices. In one embodiment of the invention, transmissions include, but are not limited to, continuous uninterrupted wireless communication Bluetooth rf transmitter. Such a device can be of any size that is reasonable to carry, with the ideal size being of 1 inch length and 1 inch width. The ALPAT device will always be running while it has power.

The battery of the ALPAT that may optionally be rechargeable and high capacity. It may be powered by nearby real world objects or it may be powered by a traditional compact battery, or even different types of radiation, such as solar power. The battery will have a full power indicator, such as a small light.

The ALPAS will be installed on the mobile device, including but not limited to: a smartphone such as an iphone or Android smartphone, a tablet such as an iPad, or a wearable device that has apps such as the FitBit Blaze or Apple watch. ALPAS will be constantly running in the background when the phone is on. ALPAS will always be in communication with the ALPAT.

In one embodiment of the invention, ALPAS will be able to determine, through an analysis of the strength of a Bluetooth signal from the mobile device, whether the ALPAT is more than a user defined distance away from the mobile device that contains ALPAS. If so, ALPAS will activate its alarm on the mobile device.

In another embodiment of the invention, both the mobile device that has ALPAS installed and the ALPAT have their own cellular or other internet connection. The ALPAS keeps track of the GPS location of the mobile device it is installed on, and the ALPAT keeps track of its GPS location and sends it to ALPAS through the internet. The ALPAS will continuously check to confirm that the 2 GPS locations are less than a user defined distance (such as 2 meters) apart. If the ALPAS determines that these two GPS locations are more than a user defined distance (such as 2 meters) apart, then the ALPAS will activate the alarm.

The ALPAT will always be in communication with the ALPAS on the mobile device. The ALPAT is able to activate the ALPAS on the mobile device automatically, even without the owner's knowledge, when triggered by the ALPAT moving more than a user determined distance from the mobile device, such as 2 meters. The ALPAS activates the mobile device's speakers to make a high volume and attention-grabbing sound, such as at 100 DB and a noise like "beep beep beep sarah your iphone sarah your iphone" and repeats indefinitely until the mobile device returns to within a user determined distance from the ALPAT. The ALPAS will also cause the mobile device's display to flash brightly on and off again indefinitely. This utilizes multiple features of a mobile device in order to indicate that it is being stolen, thus alerting the owner of the mobile device as well as other people surrounding the possible thief.

Only the owner of the mobile device can deactivate the alert by utilizing a unique password, or fingerprint, or other electronic id that is unique to the owner. If the owner recovers the mobile device while it is in an alarm state, the owner can touch the screen which will stop flashing and allow input of one of these electronic identification forms, such as a password, fingerprint or other electronic id. During this time the mobile device will continue its audio alert.

There will be millions of unique user codes available to users of the ALPAT and ALPAS. These codes will be printed on instructions that accompany the ALPAT and ALPAS when they are purchased. Users will use these codes to establish a secure communication link between the ALPAS on the mobile device and the ALPAT.

In one embodiment, the ALPAT transmits a secure unique continuous strength signal in a 2 meter radius around the mobile device.

In another embodiment, the ALPAS uses the mobile device's electronics to broadcast or receive a secure unique continuous strength signal in a 2 meter radius around the mobile device.

In another embodiment, both the ALPAT and the mobile device in which the ALPAS is installed broadcast or receive a secure unique continuous strength signal in a 2 meter radius around the mobile device.

In one embodiment of the invention, once the ALPAT is within a user defined distance such as 2 meters of the mobile device with ALPAS installed, then the ALPAS can be activated. ALPAS may exist as an app on the mobile device. The user will open ALPAS using an app, and then tap a button that verifies ALPAT is within 2 meters of the mobile device. If ALPAS detects ALPAT within 2 meters of the mobile device, then ALPAS is activated. Then if the user taps the on button within the ALPAS app and the ALPAT is more than the user-defined distance such as 2 meters away, the ALPAS app will utilize the mobile device's speakers and ask the user to "move closer" for a user-defined amount of time, such as 7 minutes. If the ALPAT is not brought within a user-defined distance within a user defined amount of time, then ALPAS will deactivate.

ALPAS has a "sync-to-activate" system, which automatically activates ALPAS if the mobile device and ALPAT are more than a user defined distance apart, and then either the mobile device or the ALPAT moves such that their distance apart is less than the user defined distance. Once the ALPAS activates, it can play a sound such as "Guard my phone alert on ALPAS activated". The "sync-to-activate" system may be turned on or off by the user. The sync-to-activate system can also be set to make the mobile device either play a sound or not play a sound upon activating the ALPAS.

The ALPAS app may optionally be protected by either password, fingerprint, or any other form of electronic protection available on the market today.

If ALPAS starts an alarm, then a user will have to enter their password, fingerprint or other electronic protection and then push a button in the app that turns off the alarm.

There will be a button on the ALPAS app that states "at home safe zone", which when pressed, deactivates ALPAS so that if the ALPAT is more than the user defined distance away from the mobile device with ALPAS, then ALPAS will not initiate an alarm. However, if the ALPAT is taken more than the user defined distance away from the mobile device, and then returns to within the user defined distance from the mobile device, ALPAS will reactivate through the "sync-to-activate" system if the "sync-to-activate" system is turned on.

The ALPAT also has a sound system. It has low decibel volume, and the volume of its alarm is not adjustable. If the ALPAS is activated, and the user has chosen to have the ALPAT make an alarm instead of the mobile device where the ALPAS is installed, then the ALPAT will sound its alarm if it moves farther than a user defined distance, and the ALPAT will make an alarm at a low decibel volume that is not adjustable, while the mobile device does not make any alarm.

In the event that a mobile device is stolen, the ALPAS will keep blaring the alarm on the mobile device in seven consecutive 3 minute sessions, with a few seconds gap in between each session. After all seven sessions have finished, ALPAS will display the owner's contact information, as well as providing a reward option. Different reward options can display on the mobile device, and will be rotated every 30 minutes.

One possible reward option is a button in the ALPAS app that would allow whoever is in possession of the mobile device to push the button and print out a FedEx prepaid Digital Label or an Amazon Digital shipping label. Then the person in possession of the mobile device can mail it back to the owner at no cost using one of these labels. The ALPAS will notify the owner once mobile device has been returned by a human, is secure, and has been accepted by a delivery driver, such as from either FedEx or UPS. The ALPAS will send the tracking number from either FedEx or UPS to the owner's email address. After that, the owner or an online service can have an electronic reward delivered to the person who returned the mobile device. The benefit to the owner in this situation is that the owner never had to confront the thief, and was still able to recover the mobile device. Another benefit is that the thief or possessor will not be as motivated to sell the mobile device on the black market, because the thief or possessor can instead be compensated by a reward. This system for returns allows for international as well as domestic returns.

One possible reward option is an electronic Amazon gift card that can be automatically sent from Amazon through email. It is also possible that Amazon itself can send the electronic Amazon gift card, so that the person who returns the mobile device is more assured that he will receive a gift, considering it is a third party who is responsible for sending the gift. Another reward option is entrance into a raffle for $10000. One more reward option is that the thief or possessor will have their identity displayed as a good Samaritan online.

Another possible option in the event that a mobile device is stolen, is that the ALPAS will broadcast the GPS location of the mobile device, and the owner can track it online from a computer. This of course displays the problems mentioned in the background, however it is still a last case option for the owner.

In another embodiment of the invention, the ALPAS will be on a mobile device, and the ALPAT will not be a stand-alone device, but instead will be installed as an app on a smart watch or other wearable device. The ALPAT will have all the same functions as the separate device embodiment of the ALPAT, but will be installed as an app on a smart watch or wearable device, and will utilize the features of a smart watch or wearable device in order to alert the user, communicate with the user and communicate with the ALPAS on the mobile device.

FIG. 1

FIG. 1 illustrates a system including one embodiment of the ALPAT.

This paragraph lists the elements of FIG. 1. FIG. 1 includes a system with multiple parts: a small mobile container 101, a transmitter 102, a connecting device 103.

In this embodiment, the mobile container 101 is a small plastic circular item that is affixed to the transmitter 102 and the connecting device 103. The transmitter 102 may be either a Bluetooth transmitter or a GPS broadcaster and receiver. The connecting device 103 allows the mobile container 101 to hook onto a keychain, making the ALPAT easier to keep with a user.

FIG. 2

Figure 2:
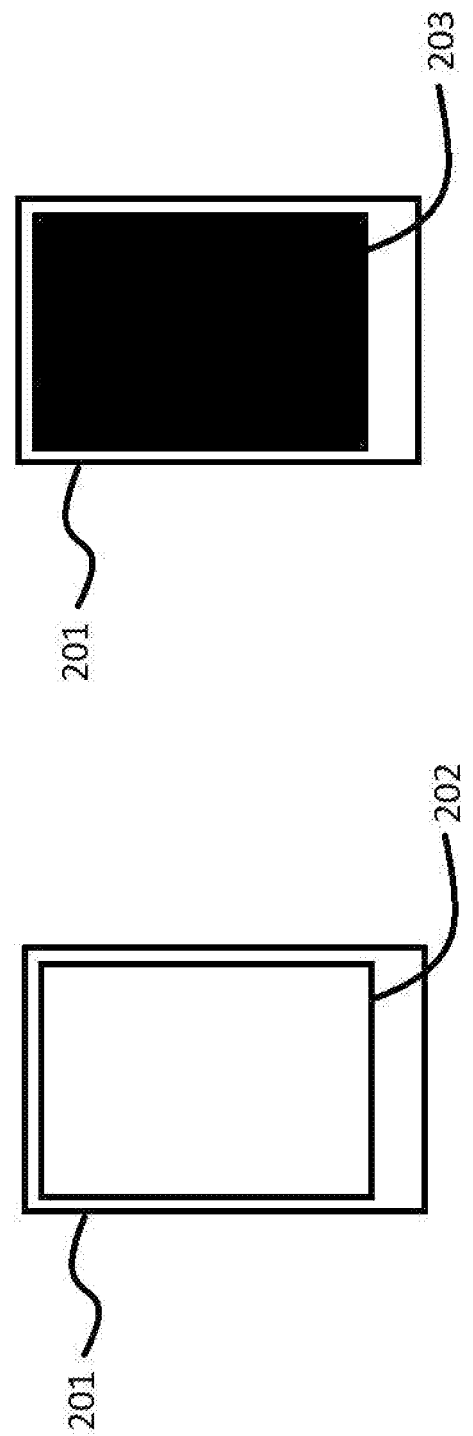
FIG. 2 illustrates a system including one embodiment of the flashing screen of the mobile device where ALPAS is installed.

FIG. 2 illustrates a system including one embodiment of the flashing screen of the mobile device where ALPAS is installed.

This paragraph lists the elements of FIG. 2. FIG. 2 includes a system with multiple parts: a mobile smartphone 201, a flashing display 202 in which the screen will display its brightest light, and then will change back to its darkest screen 203. The screen will keep alternating between brightest light and darkest screen in order to alert people nearby.

FIG. 3

Figure 3:
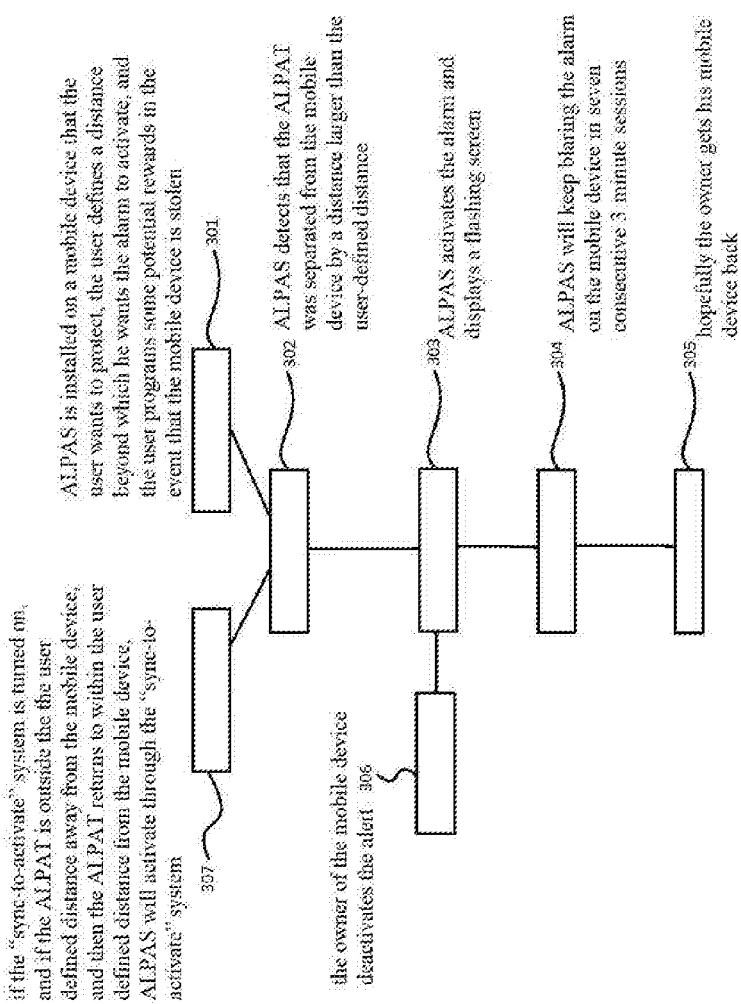
FIG. 3 illustrates a system including one embodiment of the invention that shows a flowchart of the process by which either ALPAS or ALPAT decide to activate each of their alarm systems.

FIG. 3 illustrates a system including one embodiment of the invention that shows a flowchart of the process by which either ALPAS or ALPAT decide to activate each of their alarm systems.

In step 301, ALPAS is installed on a mobile device that the user wants to protect, the user defines a distance beyond which he wants the alarm to activate, and the user programs some potential rewards in the event that the mobile device is stolen. Also in step 301, the user can program the audio that will be played in the event the mobile device is stolen. The user then presses a button in the ALPAS to activate it. Once activated, the ALPAS on the mobile device and the ALPAT are in constant contact, and the ALPAS is constantly checking the distance the ALPAT is away from the mobile device, and whether that distance is larger than the user defined distance.

Another possible start is step 307, in which if the "sync-to-activate" system is turned on, and if the ALPAT is outside the the user defined distance away from the mobile device, and then the ALPAT returns to within the user defined distance from the mobile device, ALPAS will activate through the "sync-to-activate" system.

In step 302 the ALPAS detects that the ALPAT was separated from the mobile device by a distance larger than the user-defined distance.

In step 303, the ALPAS activates the alarm and displays a flashing screen, such that the screen turns from its brightest light, to a dark screen, and then back again. Also in step 303, pre-recorded audio plays with the mobile device's speakers to make a high volume and attention-grabbing sound, such as at 100 DB and a noise like "beep beep beep sarah your iphone sarah your iphone" and repeats indefinitely until the mobile device returns to within a user determined distance from the ALPAT. The ALPAS will also cause the mobile device's display to flash brightly on and off again indefinitely.

There are now 2 possibilities, one is step 306, in which the owner of the mobile device deactivates the alert by utilizing a unique password, or fingerprint, or other electronic id that is unique to the owner. If the owner recovers the mobile device while it is in an alarm state, the owner can touch the screen which will stop flashing and allow input of one of these electronic identification forms, such as a password, fingerprint or other electronic id. During this time the mobile device will continue its audio alert.

The other possibility is step 304, in which the ALPAS will keep blaring the alarm on the mobile device in seven consecutive 3 minute sessions, with a few seconds gap in between each session. After all seven sessions have finished, ALPAS will display the owner's contact information, as well as providing a reward option. Different reward options can display on the mobile device, and will be rotated every 30 minutes. Also in step 304 the ALPAT will make noise at a fixed decibel, and the user can shut this noise off at any time.

In the final step 305, hopefully the owner gets his mobile device back because the person who has the mobile device decides to accept one of the offers. One possible reward option is a button in the ALPAS app that would allow whoever is in possession of the mobile device to push the button and print out a FedEx prepaid Digital Label or an Amazon Digital shipping label. Then the person in possession of the mobile device can mail it back to the owner at no cost using one of these labels. The ALPAS will notify the owner once the mobile device has been returned by a human, is secure, and has been accepted by a delivery driver, such as from either FedEx or UPS. The ALPAS will send the tracking number from the delivery service, such as FedEx or UPS, to the owner's email address. After that, the owner or an online service can have an electronic reward delivered to the person who returned the mobile device. The benefit to the owner in this situation is that the owner never had to confront the thief, and was still able to recover the mobile device. Another benefit is that the thief or possessor will not be as motivated to sell the mobile device on the black market, because the thief or possessor can instead be compensated by a reward. This system for returns allows for international as well as domestic returns.

One possible reward option is an electronic Amazon gift card that can be automatically sent from Amazon through email. It is also possible that Amazon itself can send the electronic Amazon gift card, so that the person who returns the mobile device is more assured that he will receive a gift, considering it is a third party who is responsible for sending the gift. Another reward option is entrance into a raffle for $10000. One more reward option is that the thief or possessor will have their identity displayed as a good Samaritan online. Another reward option is a code that allows them to get a year's free membership to a well-known service, such as Amazon Prime.

What is claimed is:

1. A system for the automatic prevention of the loss of mobile communication devices by an owner, the system comprising:
   a mobile device that includes a processor and memory;
   Automatic Loss Prevention Alert Software ("ALPAS") installed on the mobile device;
   a device which functions as an Automatic Loss Prevention Alert Trigger ("ALPAT");
   an owner-defined distance after which alarms will activate on either the mobile device, the ALPAT or both;
   the ALPAS having the ability to detect when the ALPAT has moved away from the mobile device at the owner-defined distance;
   the ALPAS having the ability to activate an alarm that will flash the screen of the mobile device brightly on and off and play a pre-recorded audio message repeatedly;
   the ALPAT having the ability to play audio at a fixed decibel;
   wherein the mobile device can potentially be any computing device, including a smartphone, a tablet or a wearable electronic device;
   wherein only the owner of the mobile device can deactivate the alert by utilizing a unique password, or fingerprint, or other electronic id that is unique to the owner;
   wherein the ALPAT can be a stand-alone small device, or can be an app on a wearable device;
   wherein the audio played in the event of an alarm on either the mobile device with the ALPAS or the ALPAT can be customized by the owner;
   the ALPAS configured to have the option to enter an "at home safe zone" mode;
   the ALPAS configured to have the option to turn on a "sync to activate" option;
   in the "at home safe zone" mode, the ALPAS is configured to deactivate so that if the ALPAT is more than the owner-defined distance away from the mobile device with ALPAS, then ALPAS will not initiate an alarm;
   if the ALPAT is taken more than the owner-defined distance away from the mobile device, and then returns to within the owner-defined distance from the mobile device, the ALPAS is configured to reactivate if the "sync-to-activate" option is turned on in the ALPAS.

2. The system of claim 1, further comprising:
the ALPAS configured to have the ability to offer a reward and bonus reward to someone who finds the mobile device, with an option to return the mobile device to the owner without meeting the owner in person;
the ALPAS configured to allow the owner to customize the reward and bonus reward offered through ALPAS;
the ALPAS configured to cycle through different rewards over fixed periods of time.

3. The system of claim 2, further comprising:
in the event of a theft, the ALPAS configured to notify the owner in real time that the mobile device has been returned by a human, is secure, and has been accepted by a delivery service which provides a tracking number in order to track the mobile device;
the ALPAS configured to send the tracking number to the owner's email address.

4. The system of claim 2, further comprising:
in the event of a theft, the ALPAS configured to offer bonus reward money if the mobile device is returned within a limited time, where the time is set by the owner.

5. The system of claim 2, further comprising:
the ALPAS communicating with the ALPAT through Bluetooth;
the ALPAS constantly analyzing the strength of the Bluetooth signal in order to determine the distance the ALPAT is away from the mobile device;
the ALPAS activating its alarm if the distance of the ALPAT from the mobile device is determined to be larger than the owner-defined distance.

6. A method for the automatic prevention of the loss of mobile communication devices by an owner, the method comprising:
installing Automatic Loss Prevention Alert Software ("ALPAS") on a mobile device that includes a processor and memory;
the ALPAS communicating with a device which functions as an Automatic Loss Prevention Alert Trigger ("ALPAT");
the ALPAS constantly analyzing whether the ALPAT has moved away from the mobile device at an owner-defined distance;
the ALPAS having the ability to activate an alarm that will flash the screen of the mobile device brightly on and off and play a pre-recorded audio message repeatedly;
the ALPAS activating the alarm on either the mobile device, the ALPAT or both, if the ALPAS detects that the ALPAT has moved away from the mobile device at an owner-defined distance; the ALPAT having the ability to play audio at a fixed decibel;
wherein the mobile device can potentially be any computing device, including a smartphone, a tablet or a wearable electronic device;
wherein only the owner of the mobile device can deactivate the alert by utilizing a unique password, or fingerprint, or other electronic id that is unique to the owner;
wherein the ALPAT can be a stand-alone small device, or can be an app on a wearable device;
wherein the audio played in the event of an alarm on either the mobile device with the ALPAS or the ALPAT can be customized by the owner;
the ALPAS having the option to enter an "at home safe zone" mode;
the ALPAS having the option to turn on a "sync to activate" option;
in the "at home safe zone" mode, the ALPAS deactivating so that if the ALPAT is more than the owner-defined distance away from the mobile device with ALPAS, then ALPAS will not initiate an alarm;
if the ALPAT is taken more than the owner-defined distance away from the mobile device, and then returns to within the owner-defined distance from the mobile device, the ALPAS reactivating if the "sync-to-activate" option is turned on in the ALPAS.

7. The method of claim 6, further comprising:
the owner customizing a reward and bonus reward offered through ALPAS in the event the mobile device is stolen;
the ALPAS offering a reward and a bonus reward to someone who finds the mobile device in the event the mobile device is stolen, with an option to return the mobile device to the owner without meeting the owner in person;
the ALPAS cycling through different rewards over fixed periods of time in the event the mobile device is stolen.

8. The method of claim 7, further comprising:
in the event of a theft, the ALPAS notifying the owner in real time that the mobile device has been returned by a human, is secure, and has been accepted by a delivery service which provides a tracking number in order to track the mobile device;
the ALPAS sending this tracking number to the owner's email address.

9. The method of claim 7, further comprising:
in the event of a theft, the ALPAS offering bonus reward money if the mobile device is returned within a limited time, where the time is set by the owner.

10. The method of claim 7, further comprising:
the ALPAS communicating with the ALPAT through Bluetooth;
the ALPAS constantly analyzing the strength of the Bluetooth signal in order to determine the distance the ALPAT is away from the mobile device;
the ALPAS activating its alarm if the distance of the ALPAT from the mobile device is determined to be larger than the owner-defined distance.

* * * * *